(12) United States Patent
Tfaily

(10) Patent No.: US 11,760,467 B2
(45) Date of Patent: *Sep. 19, 2023

(54) AIRCRAFT FLAP DEPLOYMENT SYSTEM

(71) Applicant: BOMBARDIER INC., Dorval (CA)

(72) Inventor: Ali Tfaily, Montreal (CA)

(73) Assignee: BOMBARDIER INC., Dorval (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,184

(22) Filed: Nov. 19, 2021

(65) Prior Publication Data
US 2022/0073190 A1  Mar. 10, 2022

Related U.S. Application Data

(63) Continuation of application No. 16/716,846, filed on Dec. 17, 2019, now Pat. No. 11,208,199.

(60) Provisional application No. 62/782,754, filed on Dec. 20, 2018.

(51) Int. Cl.
| | |
|---|---|
| *B64C 13/00* | (2006.01) |
| *B64C 13/28* | (2006.01) |
| *B64C 13/04* | (2006.01) |
| *B64C 7/00* | (2006.01) |
| *B64C 9/02* | (2006.01) |

(52) U.S. Cl.
CPC ............. *B64C 13/28* (2013.01); *B64C 7/00* (2013.01); *B64C 9/02* (2013.01); *B64C 13/0425* (2018.01)

(58) Field of Classification Search
CPC ............................. B64C 13/0425; B64C 9/02
See application file for complete search history.

(56) References Cited

U.S. PATENT DOCUMENTS

| | | |
|---|---|---|
| 3,556,439 A | 1/1971 | Autry et al. |
| 3,767,140 A | 10/1973 | Johnson |
| 4,131,252 A | 12/1978 | Dean et al. |
| 4,172,575 A | 10/1979 | Cole |
| 4,180,222 A | 12/1979 | Thornburg |
| 4,353,517 A | 10/1982 | Rudolph |
| 4,605,187 A | 8/1986 | Stephenson |

(Continued)

OTHER PUBLICATIONS

Wikipedia, "Flap (aeronautics)", https://en.wikipedia.org/wiki/Flap_(aeronautics) accessed Sep. 21, 2018, pdf 8 pages.

(Continued)

*Primary Examiner* — Richard G Davis
(74) *Attorney, Agent, or Firm* — BCF LLP

(57) ABSTRACT

A method for controlling a position of a flap of an aircraft includes: receiving, by an actuator, a signal indicative of a desired flap position; when the desired flap position is a retracted flap position: moving the carriage along a track to a first carriage position thereby pivoting the flap to the retracted flap position where the flap is at a neutral flap angle; when the desired flap position is an intermediate flap position: moving the carriage along the track to a second carriage position thereby pivoting the flap to the intermediate flap position where the flap is at a negative flap angle; when the desired flap position is an extended flap position: moving the carriage along the track to a third carriage position thereby pivoting the flap to the extended flap position where the flap is at a positive flap angle. An aircraft flap deployment system is also disclosed.

12 Claims, 11 Drawing Sheets

(56) References Cited

U.S. PATENT DOCUMENTS

| | | | |
|---|---|---|---|
| 4,614,320 A | 9/1986 | Rutan | |
| 4,669,687 A | 6/1987 | Rudolph | |
| 6,079,672 A | 6/2000 | Lam et al. | |
| 7,578,484 B2 | 8/2009 | Fox et al. | |
| 8,070,106 B2 | 12/2011 | Engelbrecht et al. | |
| 8,226,048 B2 | 7/2012 | Beyer et al. | |
| 8,763,953 B2 * | 7/2014 | Sakurai | B64C 9/16 |
| | | | 244/99.2 |
| 9,108,723 B2 * | 8/2015 | Lam | B64C 9/14 |
| 9,963,220 B2 * | 5/2018 | Ishihara | B64C 13/30 |

OTHER PUBLICATIONS

Rudolph, "High-Lift Systems on Commercial Subsonic Airliners", NASA Contractor Report 4746, 1996, 166 pages.

* cited by examiner

AIRCRAFT FLAP DEPLOYMENT SYSTEM

CROSS-REFERENCE

The present application is a continuation of U.S. patent application Ser. No. 16/716,846, filed on Dec. 17, 2019, which claims priority to U.S. Provisional Patent Application No. 62/782,754, filed on Dec. 20, 2018, the entirety of both of which is incorporated herein by reference.

FIELD OF TECHNOLOGY

The present technology relates generally to aircraft flap deployment systems.

BACKGROUND

Most aircraft wings are provided with flaps that are connected to the rear of the wing body. Flaps are lift devices that can be deployed to increase the lift and drag of the wing. The increased lift is useful at takeoff in order to achieve the necessary amount of lift for the aircraft to takeoff at a lower speed than would otherwise be necessary. The increased drag is useful during landing as it slows down the aircraft as it approaches the runway. However, this increased drag is not desired during flight. As such, the flaps are retracted during flight.

During takeoff and landing, the flaps are pivoted down so as to have a negative camber formed by the lower surface of the wing and an increased positive camber formed by the upper surface of the wing.

It has been found that, under some operating conditions, such as during cruise, it could be advantageous for an aircraft to have a negative camber formed by the rear upper surfaces of the wings. This reduces the drag of the wings during such conditions, which in turn results in reduced fuel consumption and/or faster aircraft speed. However, most existing systems permitting such a change in camber are very complex and therefore costly.

There is therefore a desire for a wing assembly that can modify the camber of the wing in order to reduce the drag of the wing during certain operating conditions of the aircraft.

SUMMARY

It is an object of the present technology to ameliorate at least some of the inconveniences present in the prior art.

According to one aspect of the present technology, there is provided an aircraft flap deployment system having a track; a carriage supported by the track, the carriage being movable along the track; an actuator operatively connected to the carriage, the actuator selectively moving the carriage along the track between a first carriage position, a second carriage position and a third carriage position, the second carriage position being intermediate the first and third carriage positions; a flap pivotally connected to the carriage at a first pivot point; a link having a first end and a second end, the first end of the link being pivotally connected to the flap at a second pivot point, the second pivot point being spaced from the first pivot point, the second end of the link being pivotally connected at a third pivot point to one of: the track, and a supporting structure connected to the track; and a flap controller communicating with the actuator for controlling actuation of the actuator for moving the carriage in a selected one of the first, second and third carriage positions and for maintaining the carriage in the selected one of the first, second and third carriage positions. In the first carriage position, the flap is in a retracted flap position at a neutral flap angle and the actuator maintains the carriage and the flap in position. In the second carriage position, the flap is in an intermediate flap position at a negative flap angle and the actuator maintains the carriage and the flap in position. In the third carriage position, the flap is in an extended flap position at a positive flap angle and the actuator maintains the carriage and the flap in position.

In some embodiments of the present technology, at least one flap position input device communicates with the flap controller. The flap controller controls actuation of the actuator based at least in part on a signal received from the at least one flap position input device.

In some embodiments of the present technology, the at least one flap position input device is a flap position input lever. The flap position input lever is movable between first, second and third flap lever positions. In response to the flap position input lever being moved to the first flap lever position, the flap controller causes the actuator to move the carriage to the first carriage position and to maintain the carriage in the first carriage position. In response to the flap position input lever being moved to the second flap lever position, the flap controller causes the actuator to move the carriage to the second carriage position and to maintain the carriage in the second carriage position. In response to the flap position input lever being moved to the third flap lever position, the controller causes the actuator to move the carriage to the third carriage position and to maintain the carriage in the third carriage position.

In some embodiments of the present technology, the first flap lever position is disposed between the second and third flap lever positions.

In some embodiments of the present technology, at least one aircraft operating condition sensor communicates with the flap controller for providing at least one signal representative of at least one operating condition of an aircraft provided with the flap deployment system to the flap controller. The flap controller controls actuation of the actuator based at least in part on the at least one signal.

In some embodiments of the present technology, as the actuator moves the carriage from the first carriage position to the second carriage position, the flap pivots about the first pivot point in a first direction. As the actuator moves the carriage from the second carriage position to the third carriage position, the flap pivots about the first pivot point in a second direction opposite the first direction.

In some embodiments of the present technology, as the actuator moves the carriage from the first carriage position to the carriage second position, the link pivots about the third pivot point in a third direction. As the actuator moves the carriage from the second carriage position to the third carriage position, the link pivots about the third pivot point in the third direction.

In some embodiments of the present technology, the flap translates in a third direction as the flap pivots from the retracted flap position to the intermediate flap position and from the intermediate flap position to the extended flap position.

In some embodiments of the present technology, the flap has a leading edge and a trailing edge. In the retracted flap position, a flap angle reference line passes through the leading edge and the trailing edge. In the intermediate flap position, a line passing through the leading and trailing edges is at a negative angle relative to the flap angle reference line. In the extended flap position, the line passing through the leading and the trailing edges is at a positive angle relative to the flap angle reference line.

In some embodiments of the present technology, the flap has a leading edge and a trailing edge. In the retracted flap position, a flap angle reference line passes through the leading edge and the trailing edge. The track is skewed relative to the flap angle reference line.

In some embodiments of the present technology, the flap has a leading edge and a trailing edge. The first pivot point is closer to the leading edge than the second pivot point.

In some embodiments of the present technology, the first pivot point is generally longitudinally aligned with a location of maximum thickness of the flap.

In some embodiments of the present technology, the actuator selectively moves the carriage along the track to at least one fourth carriage position. The at least one fourth carriage position is intermediate the second and third carriage positions. The intermediate flap position is an intermediate flap up position. The flap controller communicates with the actuator for controlling actuation of the actuator for moving the carriage in a selected one of the first, second, third and fourth carriage positions and for maintaining the carriage in the selected one of the first, second, third and fourth carriage positions. In the at least one fourth carriage position, the flap is in an intermediate flap down position at a positive flap angle and the actuator maintains the carriage and the flap in position.

According to another aspect of the present technology, there is provided an aircraft wing assembly having a wing body, and the flap deployment system according to one or more of the above embodiments. The flap and the track are connected to the wing body.

In some embodiments of the present technology, in the intermediate flap position, upper surfaces of a rear portion of the wing body and the flap form a negative camber. In the extended flap position, the upper surfaces of the rear portion of the wing body and the flap form a positive camber.

In some embodiments of the present technology, in the retracted flap position, the wing body and the flap have a first chord length. In the intermediate flap position, the wing body and the flap have a second chord length. The second chord length is greater than the first chord length. In the extended flap position, the wing body and the flap have a third chord length. The third chord length is greater than the second chord length.

In some embodiments of the present technology, the second chord length is between 1 and 8 percent greater than the first chord length. The third chord length is between 12 and 18 percent greater than the first chord length.

In some embodiments of the present technology, a cowl is connected to a bottom of the wing body, the cowl housing the actuator, the track and the carriage.

In some embodiments of the present technology, a spoiler is pivotally connected to a rear of the wing body. The spoiler is disposed over at least a front portion of the flap in the retracted, intermediate and extended flap positions.

In some embodiments of the present technology, the wing body has a wing body lower skin. The flap has a flap lower skin. A rear portion of the wing body lower skin overlaps a front portion of the flap lower skin at least when the flap is in the retracted flap position.

In some embodiments of the present technology, the wing body defines a door on a lower rear portion of the wing body. The door is movable between an open position and a closed position. When the flap is in the retracted flap position or the extended flap position, the door is in the closed position. When the flap is in the intermediate flap position, the door is in the open position.

According to another aspect of the present technology, there is provided an aircraft having a fuselage; a wing body connected to the fuselage; and the flap deployment system according to one or more of the above embodiments. The flap and the track are connected to the wing body.

According to another aspect of the present technology, there is provided an aircraft having a fuselage; and the aircraft wing assembly according to one or more of the above embodiments. The wing body is connected to the fuselage.

According to another aspect of the present technology, there is provided a method for controlling a position of a flap of an aircraft. The flap is pivotally connected to a carriage. The method comprises: receiving, by an actuator, a flap position signal indicative of a desired flap position; in response to the flap position signal being indicative of the desired flap position being a retracted flap position: moving, using the actuator, the carriage along a track to a first carriage position thereby pivoting the flap to the retracted flap position, in the retracted flap position, the flap being at a neutral flap angle; and maintaining the carriage and the flap in position using the actuator; in response to the flap position signal being indicative of the desired flap position being an intermediate flap position: moving, using the actuator, the carriage along the track to a second carriage position thereby pivoting the flap to the intermediate flap position, in the intermediate flap position, the flap being at a negative flap angle; and maintaining the carriage and the flap in position using the actuator; in response to the flap position signal being indicative of the desired flap position being an extended flap position: moving, using the actuator, the carriage along the track to a third carriage position thereby pivoting the flap to the extended flap position, in the extended flap position, the flap being at a positive flap angle; and maintaining the carriage and the flap in position using the actuator, the second carriage position being intermediate the first and third carriage positions.

In some embodiments of the present technology, the method further comprises receiving, by a flap controller, a flap input signal from at least one flap position input device disposed in a cockpit of the aircraft; determining, by the flap controller, the desired flap position based at least in part on the flap input signal; and sending, by the flap controller, the flap position signal to the actuator, the flap position signal being based on the desired flap position determined by the flap controller.

In some embodiments of the present technology, the at least one flap position input device is a flap position input lever; the flap controller determines that the desired flap position is the retracted flap position when the flap position input lever is in a first flap lever position; the flap controller determines that the desired flap position is the intermediate flap position when the flap position input lever is in a second flap lever position; and the flap controller determines that the desired flap position is the extended flap position when the flap position input lever is in a third flap lever position.

In some embodiments of the present technology, the first flap lever position is disposed between the second and third flap lever positions.

In some embodiments of the present technology, the method further comprises: sensing, using at least one aircraft operating condition sensor, at least one operating condition of the aircraft; receiving from the at least aircraft operating condition sensor, by a flap controller, at least one signal representative of the at least one operating condition of the aircraft; determining, by the flap controller, the desired flap position based at least in part on the at least one signal representative of the at least one operating condition of the aircraft; and sending, by the flap controller, the flap position signal to the actuator, the flap position signal being based on the desired flap position determined by the flap controller.

In some embodiments of the present technology, the flap controller determines that the desired flap position is the intermediate flap position when the sensed at least one operating condition of the aircraft is indicative of the aircraft operating under cruise conditions.

In some embodiments of the present technology, moving the carriage from the first carriage position to the second carriage position comprises pivoting the flap in a first direction; and moving the carriage from the second carriage position to the third carriage position comprises pivoting the flap in a second direction opposite the first direction.

In some embodiments of the present technology, moving the carriage from the first carriage position to the second carriage position further comprises translating the flap in a third direction; and moving the carriage from the second carriage position to the third carriage position further comprises translating the flap in the third direction.

In some embodiments of the present technology, the intermediate flap position is an intermediate flap up position. The method further comprises: in response to the flap position signal being indicative of the desired flap position being an intermediate flap down position: moving, using the actuator, the carriage along the track to a fourth carriage position thereby pivoting the flap to the intermediate flap down position, the fourth carriage position being intermediate the second and third intermediate carriage positions, in the intermediate flap down position, the flap being at a positive flap angle; and maintaining the carriage and the flap in position using the actuator.

According to another aspect of the present technology, there is provided an aircraft flap deployment system having a carriage adapted for slidable connection to a wing body; a flap pivotally connected at a first pivot point to the carriage; a link pivotally connected to the flap a second pivot point, the second pivot point being spaced from the first pivot point; an actuator operatively connected to the carriage for selectively moving the flap along a flap deployment path, the flap deployment path comprises a flap up position and a flap down position; and a flap controller communicating with the actuator for controlling actuation of the actuator for selectively positioning the flap in the flap up position and maintaining the flap in the flap up position.

In some embodiments of the present technology, in the flap up position, an upper surface of the flap and an upper surface of a rear portion of the wing body form a negative camber.

In some embodiments of the present technology, in the flap up position, the flap is at a negative flap angle; and in the flap down position, the flap is at a positive flap angle.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
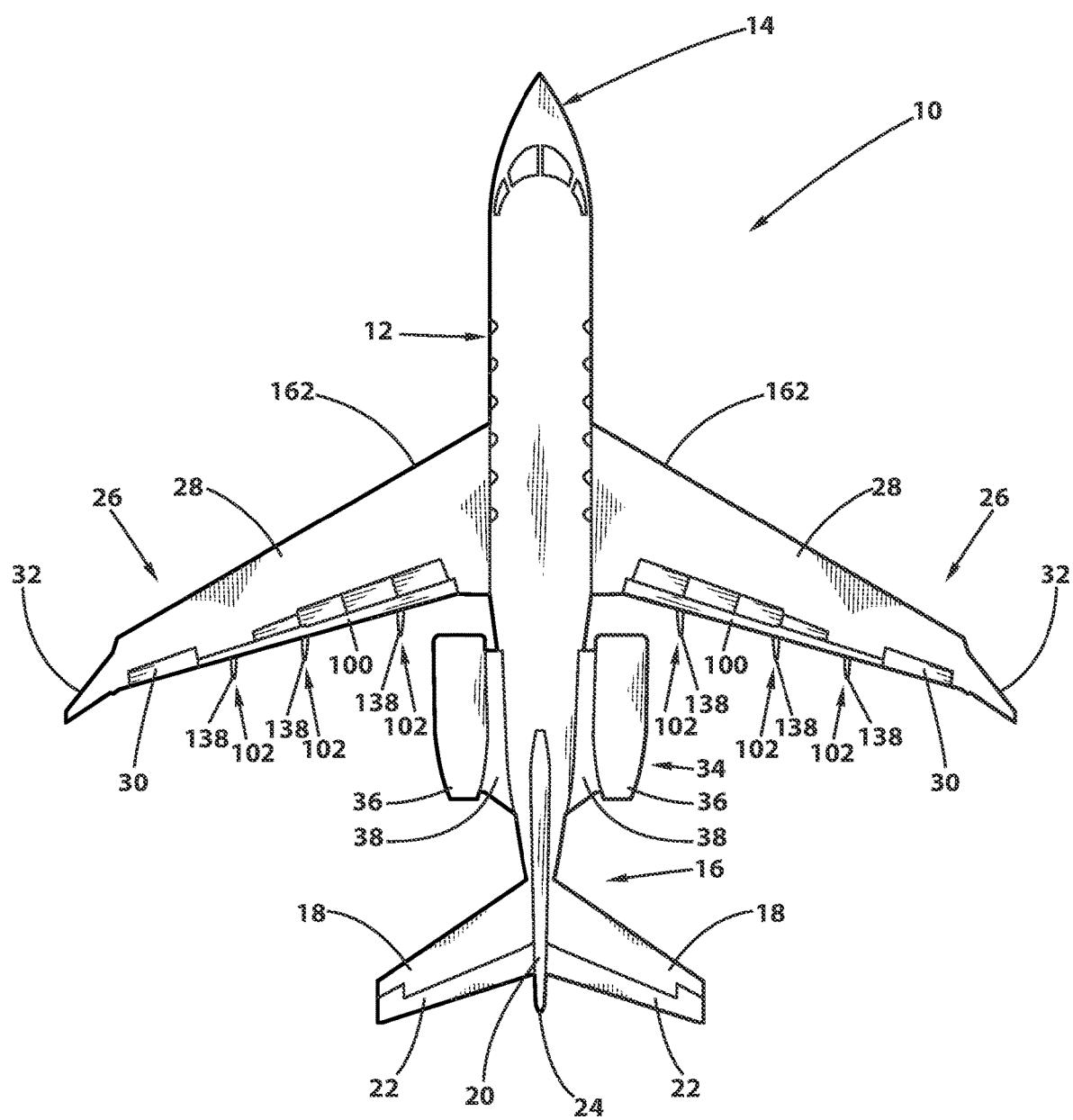
FIG. 1 is a top plan view of an aircraft.

An aircraft 10 is described below with respect to FIG. 1. The aircraft 10 is an exemplary embodiment of an aircraft and other types of aircraft are contemplated. The aircraft 10 has a fuselage 12, a cockpit 14 and a tail 16. The tail 16 has left and right horizontal stabilizers 18 and a vertical stabilizer 20. Each horizontal stabilizer 18 is provided with an elevator 22 used to control the pitch of the aircraft 10. The vertical stabilizer 20 is provided with a rudder 24 used to control the yaw of the aircraft 10. The aircraft 10 also has a pair of wings 26. The left wing 26 is connected to the fuselage 12 and extends on a left side thereof. The right wing 26 is connected to the fuselage 12 and extends on a right side thereof. Each of the wings 26 has a wing body 28, a flap 100 and an aileron 30. The flaps 100 are used to control the lift of the aircraft 10 and the ailerons 30 are used to control the roll of the aircraft 10. The flaps 100 will be described in more detail below. It is contemplated that each wing 26 could have more than one flap 100. Each wing 26 is provided with a winglet 32 at a tip thereof. It is contemplated that the winglets 32 could be omitted. Left and right engine assemblies 34 are connected to the left and right sides of the fuselage 12 respectively. As can be seen, the engine assemblies 34 are longitudinally between the wings 26 and the horizontal stabilizers 18. It is contemplated that the engine assemblies 34 could be provided elsewhere on the aircraft 10, such as below the wings 26. Each engine assembly 34 has a nacelle 36 inside which is an engine (not shown). In the present embodiment, the engine is a turbofan engine. It is contemplated that other types of engines could be used. A pylon 38 is connected between the nacelle 36 and a corresponding side of the fuselage 12.

The aircraft 10 is provided with many more components and systems, such as a landing gear and auxiliary power unit, which will not be described herein.

Figure 2:
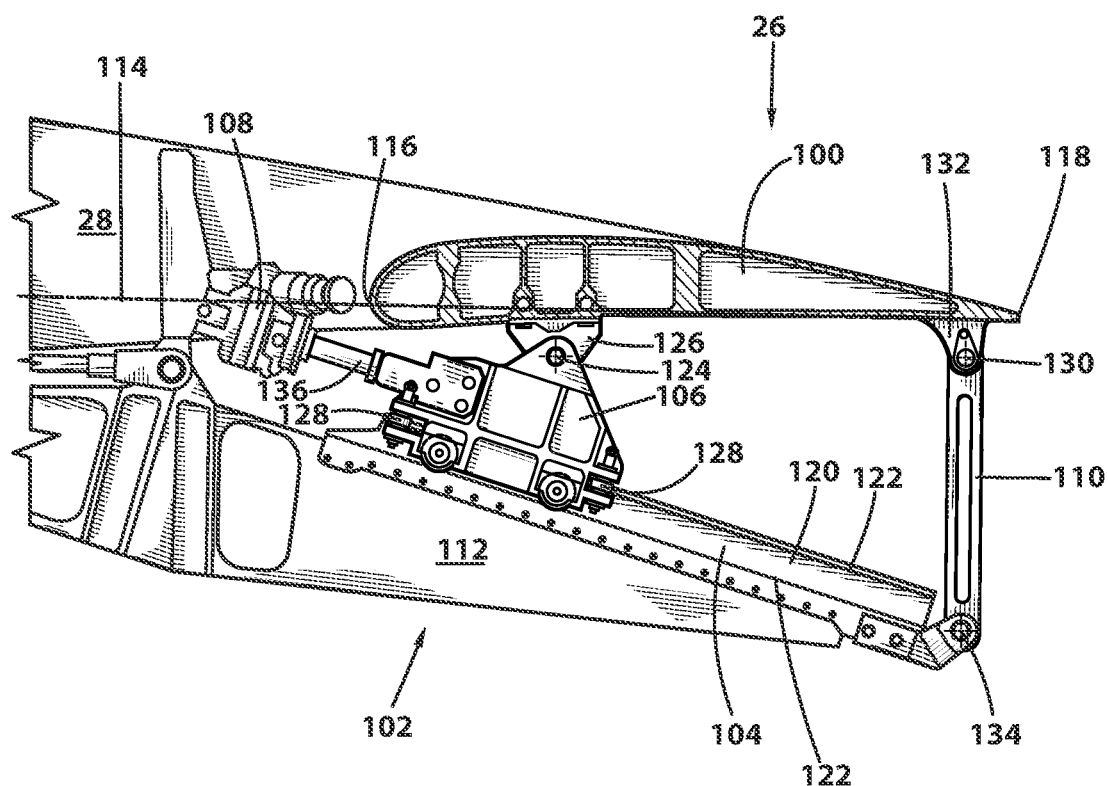
FIG. 2 is a cross-sectional view of a portion of an aircraft wing assembly of the aircraft of FIG. 1 having a aircraft flap deployment system.

Turning now to FIG. 2, one of the two wing assemblies of the aircraft 10 will be described in more detail. As both wing assemblies have the same components, the other wing assembly will not be described herein. The wing assembly includes the wing 26, three flap actuation systems 102 (see FIG. 1), and other components of a flap deployment system described below. It is contemplated that more or less than three flap actuation systems 102 could be provided depending on the size of the flap 100 and depending on the specific design of the flap actuation system 102. As all three flap actuation systems 102 have the same components, only one flap actuation system 102 will be described in detail herein.

As can be seen in FIG. 2, the flap 100 is provided at a rear portion of the wing body 28. The flap actuation system 102 movably connects the flap 100 to the wing body 28. The flap actuation system 102 selectively moves the flap 100 relative to the wing body 26 along a flap deployment path, as will be described in greater detail below with respect to FIGS. 3 to 6.

The flap actuation system 102 includes a track 104, a carriage 106, an actuator 108 and a link 110. The track 104 is connected to the wing body 28 via a supporting structure 112. As can be seen, the track 104 is disposed at an angle relative the bottom surface of the wing body 28, such that the track 104 extends away from the wing body 28 as it extends rearward. The track 104 is also skewed relative to a flap angle reference line 114. The flap angle reference line 114 is a straight line passing through the leading edge 116 and the trailing edge 118 of the flap 100 when the flap 100 is in a retracted flap position, which is the position of the flap 100 in FIG. 2. The track 104 has a vertical portion 120 and horizontal top and lower portions 122, such that the track 104 has a generally I-shaped cross-section. It is contemplated that the track 104 could have a cross-section with a different shape suitable for use with a different type of carriage 106.

The carriage 106 is supported by the track 104. As will be described in more detail below, the carriage 106 is movable along the track 104 in order to move the flap 100 to different flap positions. The carriage 106 is pivotally connected to the flap 100 at a pivot point 124 via a tab 126. The tab 126 is fixedly connected to a bottom of the flap 100. As can be seen, the pivot point 124 is generally longitudinally aligned with a location of the maximum thickness of the flap 100. The carriage 106 has four lower rollers (not shown), two on each side of the vertical portion 120 of the track 104, that roll along the surfaces of the horizontal portions 122 of the track 104. The carriage 106 also has four guide rollers 128, two on each side of the top horizontal portion 122 of the track 104, that roll along the sides of the top horizontal portion 122 of the track 104.

The link 110 has one end pivotally connected to the flap 100 near a rear of the flap 100 at a pivot point 130 via a tab 132. The tab 132 is fixedly connected to the bottom of the flap 100. As can be seen, the pivot points 124, 130 are spaced from each other such that the pivot point 124 is disposed closer to the leading edge 116 of the flap 100 than the pivot point 130. The other end of the link 110 is pivotally connected to the rear end of the track 104 at a pivot point 134. It is contemplated that the link 110 could be pivotally connected to the supporting structure 112 instead of the track 104. As the actuator 108 moves the carriage 106 along the track 104 to move the flap 100 along its flap deployment path, the pivot point 124 moves linearly parallel to the track 104 and the pivot point 130 moves in an arc having the pivot point 134 at its center. It is contemplated that additional linkages could be connected between the carriage 106 and the tab 126, between the link 110 and the tab 132, and/or between the link 110 and the track 104 in order to obtain a more complex motion of the flap 100 as the carriage 106 moves along the track 104. It is also contemplated that the link 110 could be replaced by a member having an adjustable length, such as a linear hydraulic actuator for example, to change the distance between the pivot points 130, 134 as the carriage 106 moves along the track 104 in order to obtain a more complex motion of the flap 100 as the carriage 106 moves along the track 104. By changing one or more of the position of the pivot point 124 relative to the flap 100, the position of the pivot point 130 relative to the flap 100, the position of the pivot point 134 relative to the flap 100, the length of the link 110, the length of the track 104, and the angle of the track 104 relative to the flap angle reference line 114, the shape of the flap deployment path can be modified.

The carriage 106 is connected at its front to the actuator 108. The actuator 108 is connected to the wing body 28 forward of the carriage 106. In the present embodiment, the actuator 108 is a linear ball screw mechanical actuator having an extendible shaft 136 connected to the front of the carriage. The shaft 136 pushes and pulls the carriage 106 along the track 104 when the actuator 108 is actuated to move the carriage 106 to the desired carriage position. When the carriage 106 has reached the desired carriage position along the track 104, the actuator 108 stops moving the carriage 106 and maintains the carriage 106 in the desired carriage position, and therefore the flap 100 in this carriage position until the flap 100 needs to be moved to a different carriage position. It is contemplated that the actuator 108 could be of a different type. For example, it is contemplated that the actuator 108 could be a pneumatic, hydraulic, rotary, or electric actuator. In one embodiment, for each wing 36, all of the actuators 108 have a common power drive unit which is used to actuate all of the actuators 108 simultaneously.

For each flap actuation system 102, a fairing or cowl 138 (FIG. 1) is connected to the bottom of the wing body 28. The cowl 138 houses the track 104, the carriage 106, the actuator 108, a portion of the link 110 and the supporting structure 112 in order to improve the aerodynamics of the wing assembly.

Figure 14:
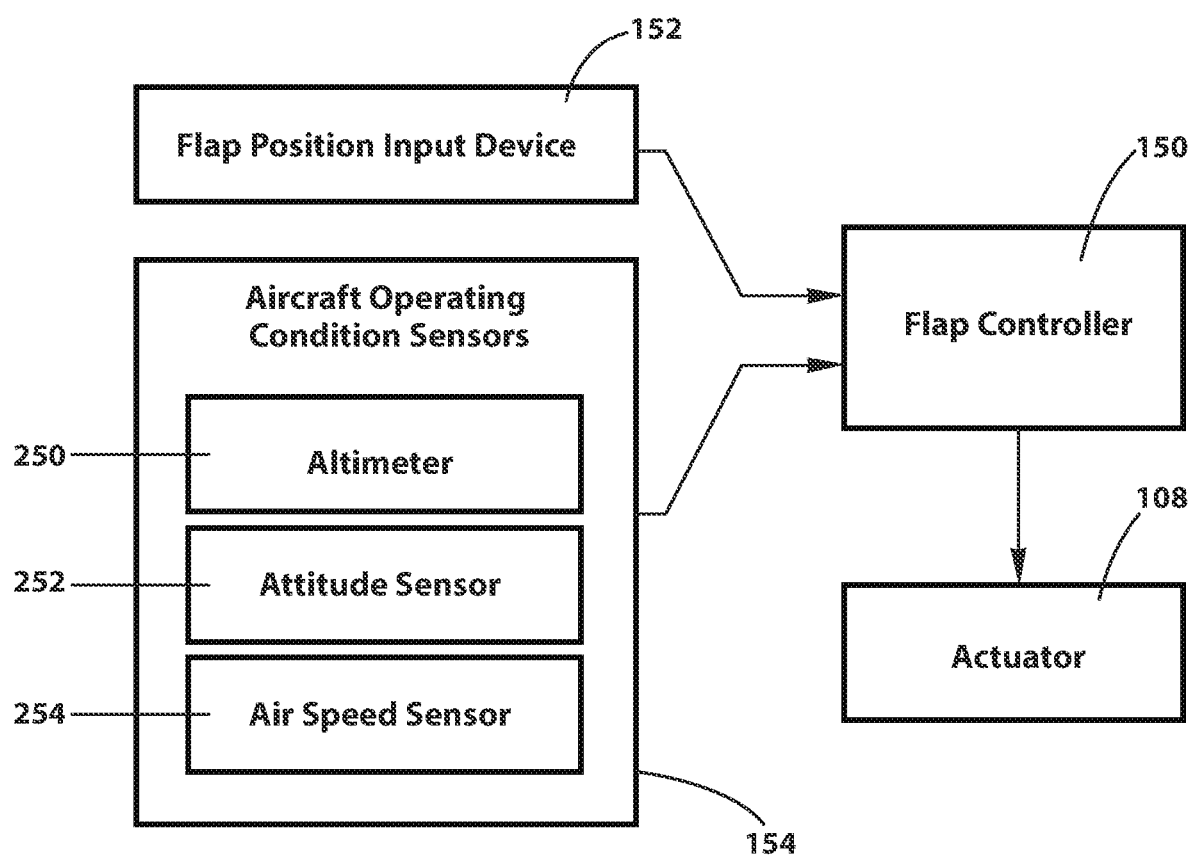
FIG. 14 is a schematic illustration of components of the aircraft flap deployment system of the aircraft of FIG. 1.

With reference to FIG. 14, the actuator 108 communicates with a flap controller 150 which controls actuation of the actuator 108, and therefore the positions of the carriage 106 and the flap 100. It is contemplated that the flap controller 150 could communicate with the actuator 108 via a wired connection or a wireless connection. In the present embodiment, a single flap controller 150 communicates with and controls all the actuators 108 of all the flap actuation systems 102 of the aircraft 10. It is contemplated that one flap controller 150 could communicate with and control the actuators 108 of the flap actuation systems 102 of the right wing 26 and that another flap controller 150 could communicate with and control the actuators 108 of the flap actuation systems 102 of the left wing 26. It is also contemplated that each actuator 108 could be provided with a dedicated flap controller 150. It is also contemplated that each actuator 108 could communicate with more than one flap controller 150 for redundancy. It is contemplated that the functions of the flap controller 150 could be incorporated into a multi-function controller of the aircraft 10, which for purposes of the present application would still be considered a flap controller.

As will be described in greater detail below, in order to control actuation of the actuator 108, the flap controller 150 communicates with and receives input signals from at least one flap position input device 152 located in the cockpit 14 of the aircraft 10 and/or from one or more aircraft operating condition sensors 154. It is contemplated that the flap controller 150 could communicate with the at least one flap position input device 152 and with the one or more aircraft operating condition sensors 154 via wired connections and/or wireless connections. The flap controller 150 together with the flap actuation system 102, the flap position input device(s) 152 and/or the aircraft operating condition sensor(s) 154 form an aircraft flap deployment system.

Turning now to FIGS. 3 to 6, four different flap positions of the flap 100 resulting from four different carriage positions of the carriage 106 along the track 104 which can be maintained by the actuator 108 will be described. In one embodiment, although the flap 100 and the carriage 106 are moved continuously by the actuator 108 between the flap positions and carriage positions illustrated in FIGS. 3 to 6, the actuator 108 does not stop to maintain the flap 100 and the carriage 106 in positions intermediate those illustrated in FIGS. 3 to 6. It is contemplated that there could be one or more flap positions and carriage positions intermediate the positions shown in FIGS. 3 and 4 at which the actuator 108 could stop and maintain the flap and carriage positions. It is also contemplated that there could be one or more flap positions and carriage positions intermediate the positions shown in FIGS. 4 and 5 at which the actuator 108 could stop and maintain the flap and carriage positions. It is also contemplated that there could be one or more flap positions and carriage positions intermediate the positions shown in FIGS. 5 and 6 at which the actuator 108 could stop and maintain the flap and carriage positions. It is also contemplated that the actuator 108 could not stop and maintain the flap 100 and the carriage 106 in the flap position and carriage position shown in FIG. 5. For simplicity, when referring to directions of pivoting (i.e. clockwise or counter-clockwise) in the explanations provided below with respect to FIGS. 3 to 6, these should be understood from the frame of reference of the Figures.

Figure 3:
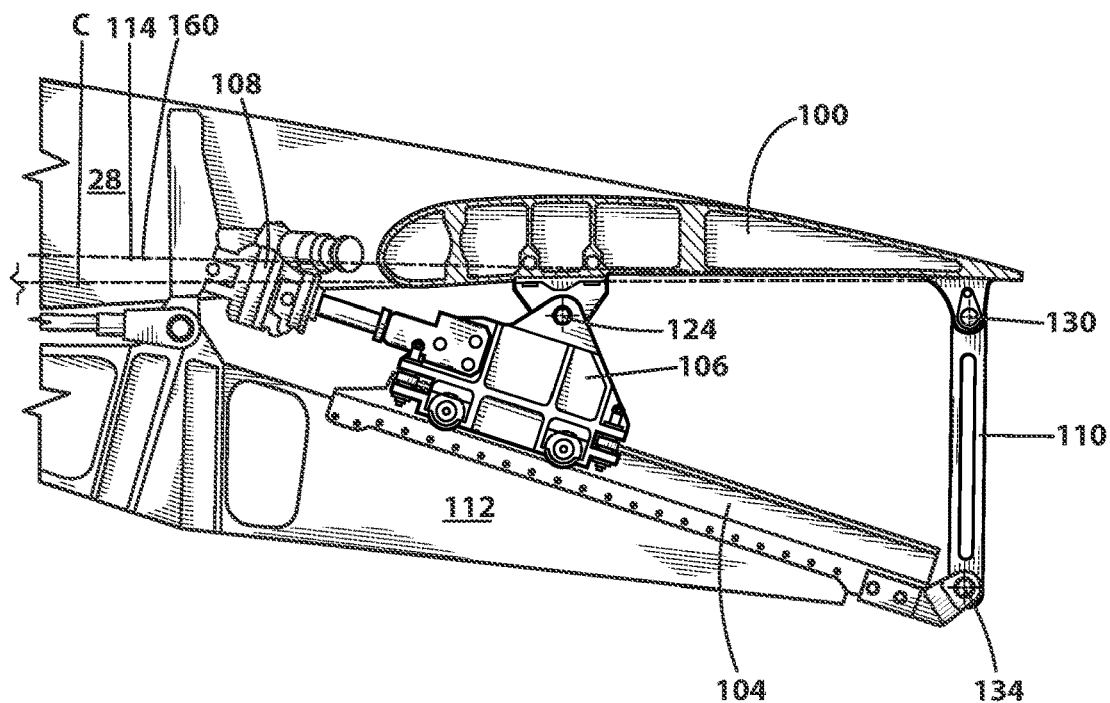
FIG. 3 is a schematic cross-sectional view of the aircraft wing assembly of FIG. 2, with the flap in a retracted flap position.

With reference to FIG. 3, when the actuator 108 stops and maintains the carriage 106 in the illustrated carriage position, the flap 100 is maintained in the illustrated flap position which is referred to herein as a retracted flap position. This carriage position may be the forwardmost position of the carriage 106. In the retracted flap position, the flap 100 is at a neutral flap angle. The flap 100 is at the neutral flap angle when a straight line 160 passing through the leading edge 116 and the trailing edge 118 of the flap 100 corresponds to the flap reference line 114. As such the angle between the line 160 and the flap reference line 114 is zero degree. When the flap 100 is in the retracted position, a chord C of the wing body 28 and the flap 100 has a length C1, which is the shortest chord length for all of the flap positions of the flap 100. The chord C is the straight line extending from a leading edge 162 (FIG. 1) of the wing body 28 to the trailing edge 118 of the flap 100. As the wing body 28 could not be completely included in FIGS. 3 to 6 in order to clearly illustrate the flap 100, the track 104, the carriage 106 and the link 110, the chord C is also not shown completely in these figures.

Figure 4:
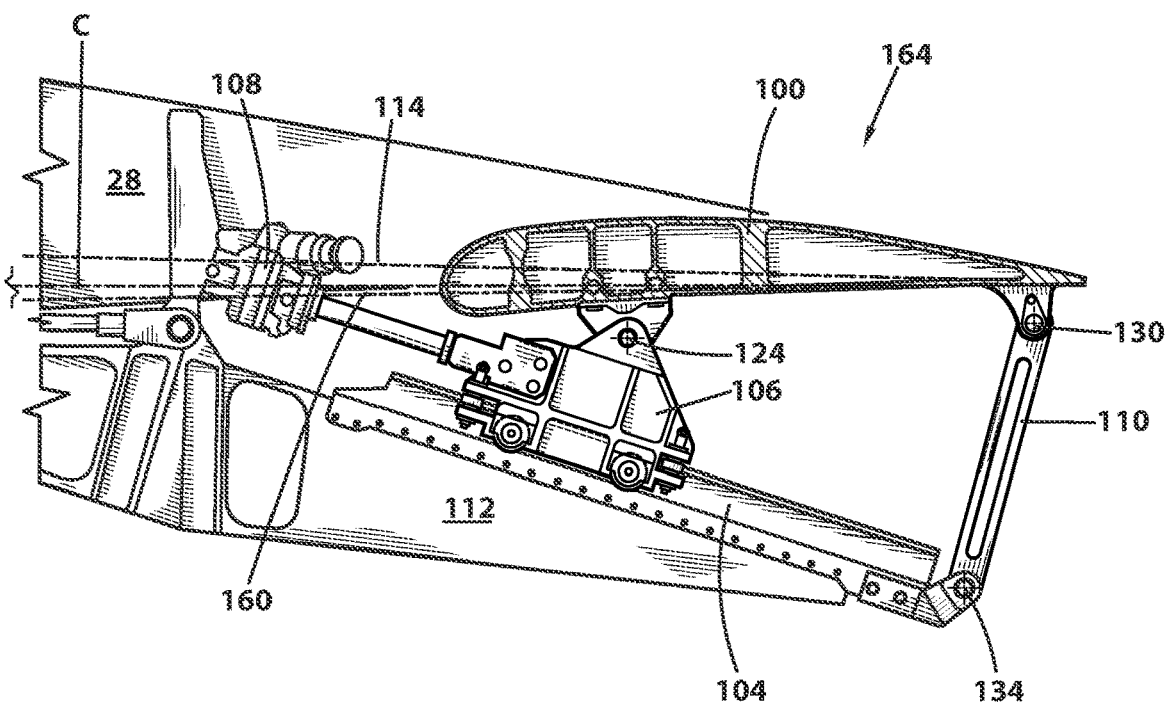
FIG. 4 is a schematic cross-sectional view of the aircraft wing assembly of FIG. 2, with the flap in an intermediate flap up position.

As the actuator 108 moves the carriage 106 rearward along the track 104 from the carriage position shown in FIG. 3 to the carriage position shown in FIG. 4, the flap 100 translates rearward and pivots counter-clockwise about the pivot axis 124 and the link 110 pivots clockwise about the pivot axis 134. The translation of the flap 100 as the flap 100 pivots is known as Fowler motion.

With reference to FIG. 4, when the actuator 108 stops and maintains the carriage 106 in the illustrated carriage position, the flap 100 is maintained in the illustrated flap position which is referred to herein as an intermediate flap up position. In the intermediate flap up position, the flap 100 is at a negative flap angle. The flap 100 is at a negative flap angle when the straight line 160 extends downward and forward from the intersection between the line 160 and the flap reference line 114. As such the angle between the line 160 and the flap reference line 114 is negative. As a result, the rear of the flap 100 points up relative to the retracted flap position. As is generally indicated by reference arrow 164, in the intermediate flap up position, the upper surfaces of the rear portion of the wing body 28 and the flap 100 form a negative camber. The negative camber improves the lift to drag ratio by decreasing drag during certain flight conditions of the aircraft 10. The negative camber also reduces the lift-induced drag of the wing 26 which can be advantageous during some operating conditions of the aircraft 10, such as during cruise. When the flap 100 is in the intermediate flap up position, the chord C has a length C2, which is longer than the chord length C1 when the flap 100 is in the retracted flap position. In some embodiment, the chord length C2 is between 1 and 8 percent greater than the chord length C1. In the present embodiment, the intermediate flap up position is the flap position having a negative flap angle with the greatest magnitude possible with the flap actuation system 102, but it is contemplated that the actuator 108 could maintain the carriage 106 and the flap 100 in an intermediate flap up position having a negative flap angle with a smaller magnitude. It is also contemplated that the actuator 108 could stop and maintain the carriage 106 in multiple carriage positions resulting in intermediate flap up positions having different negative flap angles. It is also contemplated that in an alternative embodiment, the link 110 could be tilted more toward the front of the aircraft 10 when the flap 100 is in the retracted position. In such an alternative embodiment, the flap 100 would have a wider range of positions having a negative flap angle and the negative flap angle having the greatest magnitude would have a greater magnitude than in the embodiment illustrated in the figures thereby providing a more pronounced negative camber.

Figure 5:
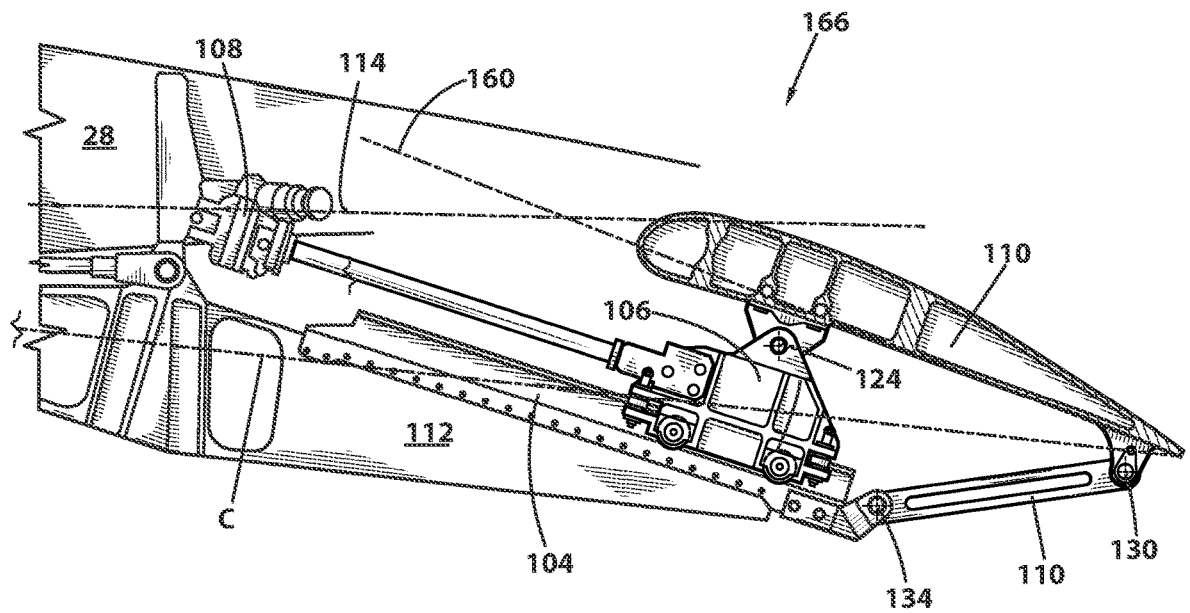
FIG. 5 is a schematic cross-sectional view of the aircraft wing assembly of FIG. 2, with the flap in an intermediate flap down position.

As the actuator 108 moves the carriage 106 rearward along the track 104 from the carriage position shown in FIG. 4 to the carriage position shown in FIG. 5, the flap 100 translates rearward and pivots clockwise about the pivot axis 124 and the link 110 pivots clockwise about the pivot axis 134.

With reference to FIG. 5, when the actuator 108 stops and maintains the carriage 106 in the illustrated carriage position, the flap 100 is maintained in the illustrated flap position which is referred to herein as an intermediate flap down position. In the intermediate flap down position, the flap 100 is at a positive flap angle. The flap 100 is at a positive flap angle when the straight line 160 extends upward and forward from the intersection between the line 160 and the flap reference line 114. As such the angle between the line 160 and the flap reference line 114 is positive. As a result, the rear of the flap 100 points down relative to the retracted flap position. As is generally indicated by reference arrow 166, in the intermediate flap down position, the upper surfaces of the rear portion of the wing body 28 and the flap 100 form a positive camber. The positive camber increases wing lift compared to the wing lift generated when the flap 100 is in the retracted flap position. When the flap 100 is in the intermediate flap down position, the chord C has a length C3, which is longer than the chord lengths C1 and C2 described above. In some embodiment, the chord length C3 is between 8 and 12 percent greater than the chord length C1. It is contemplated that the actuator 108 could maintain the carriage 106 and the flap 100 in an intermediate flap down position having a positive flap angle with a magnitude that is different from the one illustrated. It is also contemplated that the actuator 108 could stop and maintain the carriage 106 in multiple carriage positions resulting in intermediate flap down positions having different positive flap angles.

Figure 6:
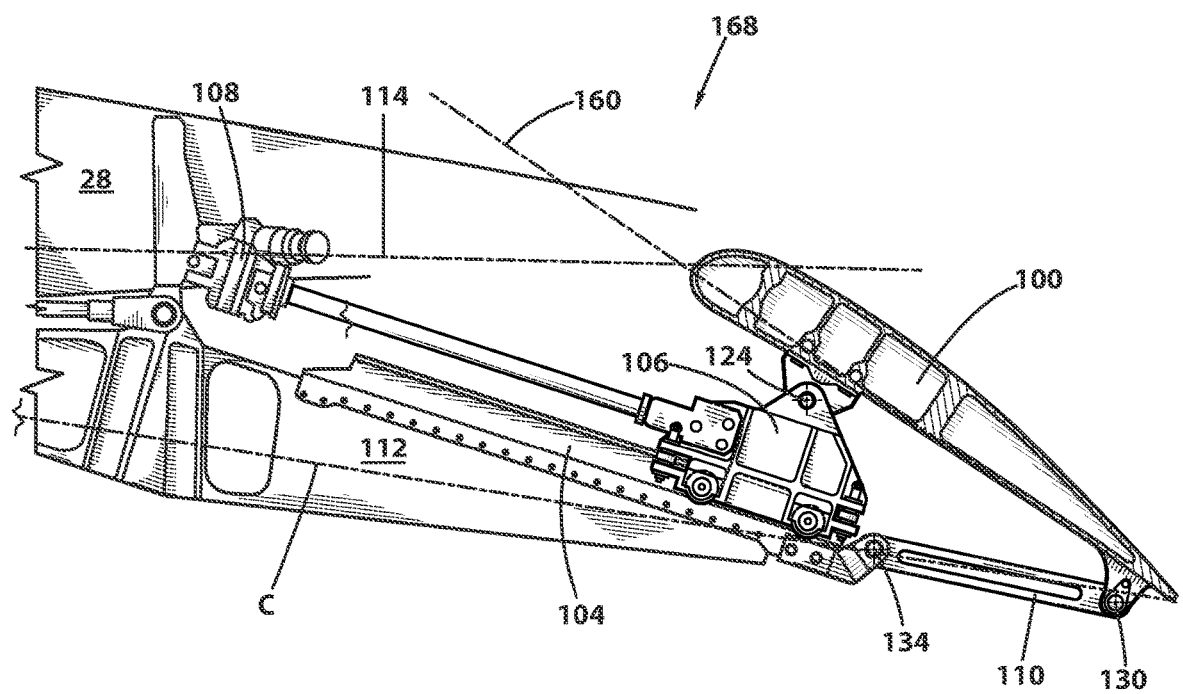
FIG. 6 is a schematic cross-sectional view of the aircraft wing assembly of FIG. 2, with the flap in an extended flap position.

As the actuator 108 moves the carriage 106 rearward along the track 104 from the carriage position shown in FIG. 5 to the carriage position shown in FIG. 6, the flap 100 translates rearward and pivots clockwise about the pivot axis 124 and the link 110 pivots clockwise about the pivot axis 134.

With reference to FIG. 6, when the actuator 108 stops and maintains the carriage 106 in the illustrated carriage position, the flap 100 is maintained in the illustrated flap position which is referred to herein as an extended flap position. This carriage position is the rearmost position of the carriage 106. In the extended flap position, the flap 100 is at a positive flap angle which is greater than in the intermediate flap down position of FIG. 5. As is generally indicated by reference arrow 168, in the extended flap position, the upper surfaces of the rear portion of the wing body 28 and the flap 100 form a positive camber. The positive camber increases wing lift compared to the wing lift generated when the flap 100 is in the retracted flap position. When the flap 100 is in the extended flap position, the chord C has a length C4, which is longer than the chord lengths C1, C2 and C3 described above. In some embodiment, the chord length C4 is between 12 and 18 percent greater than the chord length C1.

From the actuator 108 can also move the carriage 106 from the carriage position shown in FIG. 6 to the carriage position shown in FIG. 5, from the carriage position shown in FIG. 5 to the carriage position shown in FIG. 4, and from the carriage position shown in FIG. 4 to the carriage position shown in FIG. 3. The actuator 108 can also reverse the direction of the carriage 106 at any point along the track 104 (i.e. the carriage 106 does not need to reach the carriage positions shown in FIGS. 3 and 6 before it can reverse direction).

Figure 7:
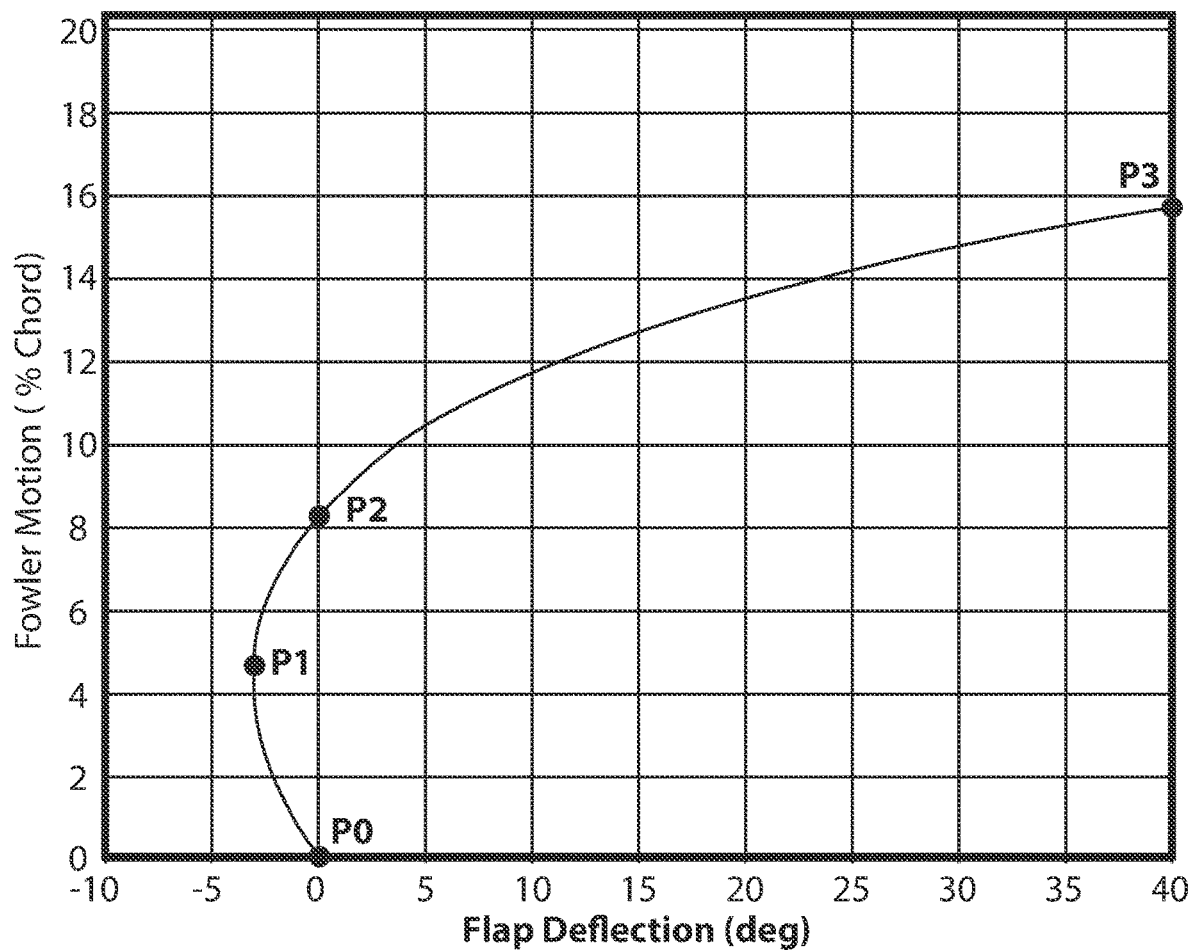
FIG. 7 is a graph illustrating a flap deployment path of the flap of the aircraft of FIG. 1.

FIG. 7 illustrates an exemplary embodiment of the flap deployment path of the flap 100 in terms of flap angle (x-axis, flap deflection in degrees) and Fowler motion (y-axis, percentage increase of chord length from the retracted flap position). As can be seen in FIG. 7, from the retracted flap position P0 (i.e. flap position shown in FIG. 3, 0 degree deflection, 0 percent chord length increase), the flap angle of the flap 100 is negative and continuously decreases until the flap 100 reaches flap position P1. In the present embodiment, flap position P1 is at a flap angle of about −3 degrees and at about 5 percent of chord length increase, but other values are contemplated. In one embodiment, the intermediate flap up position shown in FIG. 4 corresponds to flap position P1. From the flap position P1, as the flap 100 moves toward the extended flap position P3 (i.e. flap position shown in FIG. 6), the flap angle of the flap 100 continuously increases. The flap angle remains negative until the flap reaches flap position P2, and is then positive from flap position P2 to flap position P3. In the present embodiment, the flap position P2 is at 0 degree and at about 8 percent of chord length increase and the extended flap position is at about 40 degrees and at about 16 percent of chord length increase, but other values are contemplated. The intermediate flap down position shown in FIG. 5 is on the flap deployment path between flap positions P2 and P3 in FIG. 7. The flap 100 follows the same flap deployment path as it is returned to the retracted flap position P0.

Turning now to FIGS. 8 to 13, various embodiments of flap position input devices 152 will be described. The flap position input devices 152 are used to control the flap positions of the flaps 100 on both sides of the aircraft 10, but it is contemplated that each side could be provided with dedicated flap position input devices 152. The flap position input devices 152 may be located in the cockpit 14 and are controlled by a pilot or a co-pilot of the aircraft 10. In the case of an unmanned aircraft, the flap position input devices 152 may be located in a ground station and controlled by a remote pilot or co-pilot. Although the embodiments shown in FIGS. 9 to 13 have flap position input levers as flap position input devices 152, it is contemplated that other types of input devices could be used. For example, in at least some embodiments the levers could be replaced by switches, buttons, rotatable knobs, or touch screens.

Figure 8:
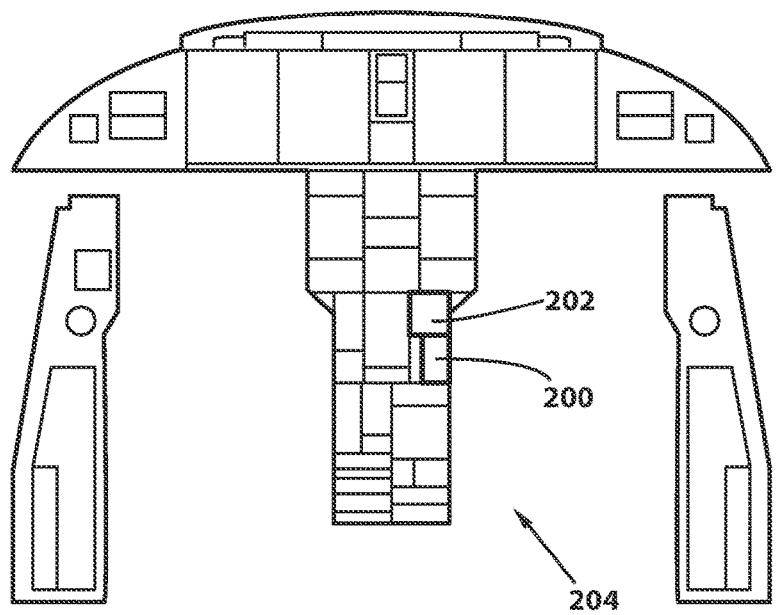
FIG. 8 is a schematic illustration of instrument panels of a cockpit of the aircraft of FIG. 1.
Figure 9:
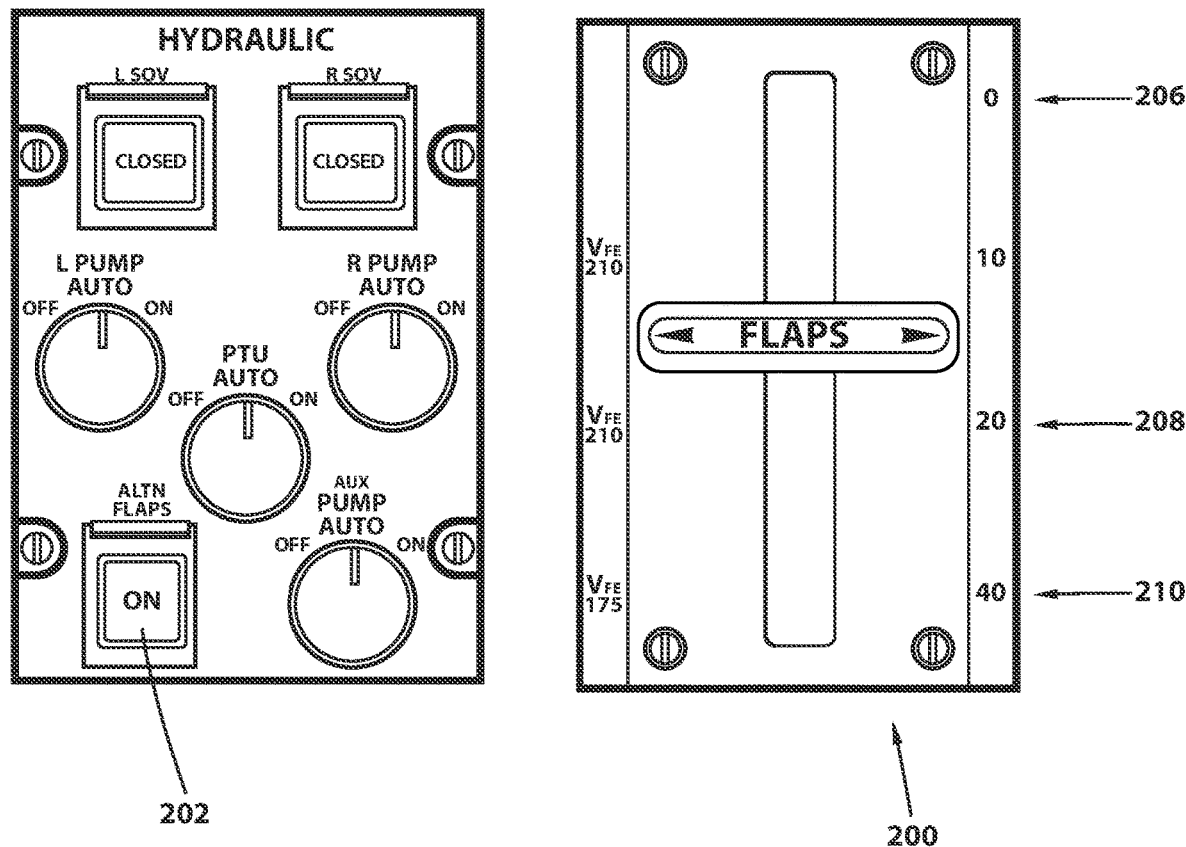
FIGS. 9 to 13 illustrate various embodiments of flap position input devices of the aircraft of FIG. 1.

In the embodiment shown in FIG. 9, the flap position input devices 152 include a flap position input lever 200 and an alternative flap position button 202. As can be seen in FIG. 8, the flap position input lever 200 and the alternative flap position button 202 are disposed in the central instrument console 204 in the cockpit 14. The flap position input lever 200 has multiple flap lever positions including a flap lever position 206 corresponding to the retracted flap position of FIG. 3, a flap lever position 208 corresponding to the intermediate flap down position of FIG. 5, and a flap lever position 210 corresponding to the extended flap position of FIG. 6. The flap controller 150 receives a flap input signal indicative of the position of the flap input lever 200. In one embodiment, the flap controller 150 determines the desired flap position based on the flap input signal and sends a flap position signal to the actuator 108 to move the carriage 106 to a position providing the desired flap position.

In one embodiment, pressing the alternative flap position button 202 sends a flap input signal to the flap controller 150 that the intermediate flap up position of FIG. 4 is desired. In one version of such an embodiment, the flap controller 150 will send a flap position signal to the actuator 108 to move the carriage 106 to the position shown in FIG. 4 to put the flap 100 in the intermediate flap up position only if the flap position input lever 200 is in the flap lever position 206. In another version of such an embodiment, the flap controller 150 will send a flap position signal to the actuator 108 to move the carriage 106 to the position shown in FIG. 4 to put the flap 100 in the intermediate flap up position regardless of the position of the flap position input lever 200. Pressing the flap position button 202 again sends a flap input signal to the flap controller 150 to send a flap position signal to the actuator 106 to move the carriage 106 to provide the flap position corresponding to the position of the flap position input lever 200. It is contemplated that once the flap 100 is in the intermediate flap up position, any change in position of the flap position input lever 200 will send a flap input signal to the flap controller 150 overriding the flap input signal from the flap input button 202. For example, if the flap position input lever 200 is in the flap lever position 206 and the button 202 is pressed, the flap controller 150 will send a flap position signal to the actuator 108 to move the carriage 106 to the position providing the intermediate flap up position, but if the flap position input lever 200 is then moved to the flap lever position 208, the flap controller 150 will send a flap position signal to the actuator 108 to move the carriage 106 to the position providing the intermediate flap down position even if the button 202 has not been pressed again.

In another embodiment, pressing the alternative flap position button 202 sends a signal to the flap controller 150 that the position of the flap 100 is to be controlled based on at least one signal representative of at least one operating condition of the aircraft 10 provided by at least one aircraft operating condition sensor 154. As will be described in greater detail below, in such an embodiment, the flap controller 150 will send a flap position signal to the actuator 108 to move the carriage 106 to the position providing the intermediate flap up position when certain aircraft operating conditions are met. It is contemplated that the flap controller 150 will only send such a signal if the flap position input lever 200 is in the flap lever position 206. It is also contemplated that a change in position of the flap position input lever 200 could send a flap input signal to the flap controller 150 to send a flap position signal to the actuator 108 overriding the flap position signal based on the aircraft operating conditions. It is also contemplated that when the flap position button 202 is pressed, the flap controller 150 could send a flap position signal to the actuator 108 based on the flap lever position and could then send another signal to the actuator to slightly adjust this position based on the aircraft operating conditions.

Figure 10:
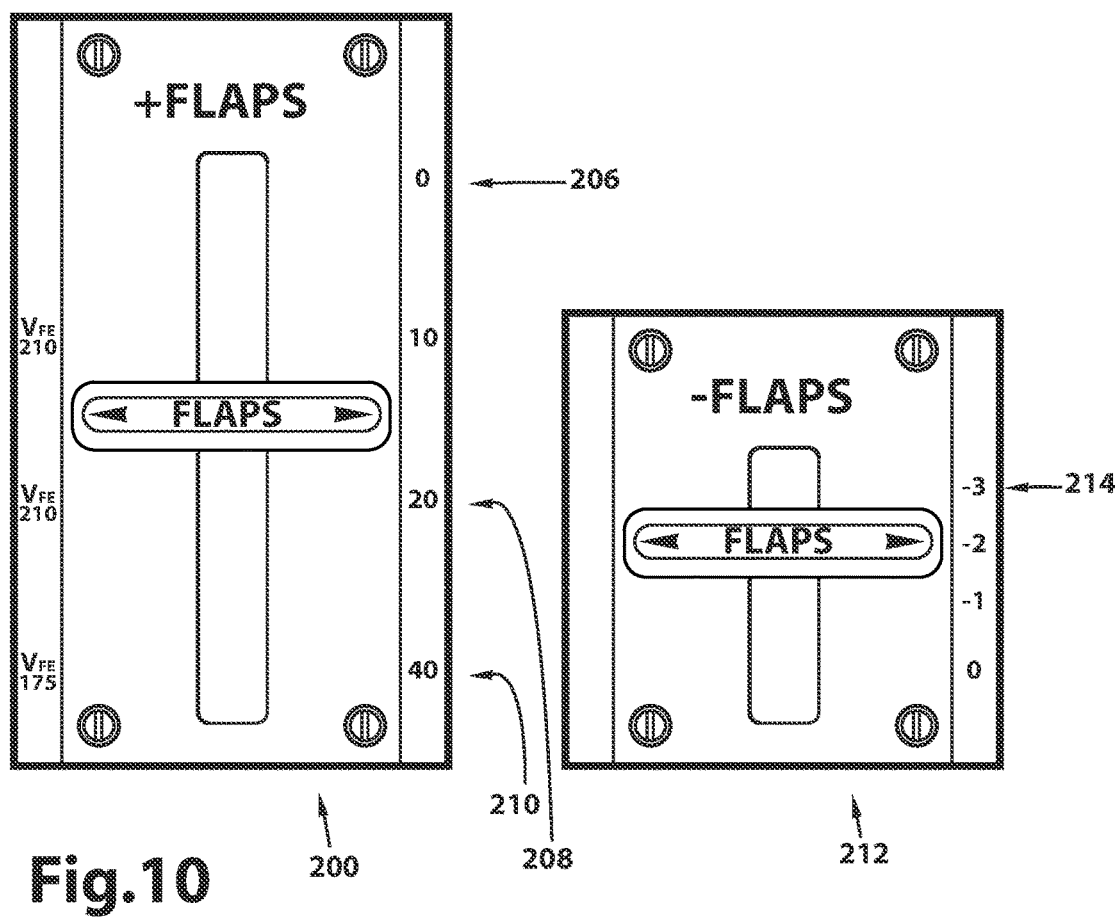

In the embodiment shown in FIG. 10, the flap position input devices 152 include the flap position input lever 200 and a flap position input lever 212. The flap position input lever 200 is used to control the flap 100 in positions having positive flap angles and the retracted flap position. The flap position input lever 212 is used to control the flap 100 in positions having negative flap angles, including a flap input lever position 214 corresponding the intermediate flap up position of FIG. 4. The flap controller 150 receives flap input signals corresponding to the positions of the flap position input levers 200, 212. When the flap position input lever 200 is in the flap lever position 206 and the flap position input lever 212 is moved to a flap lever position corresponding to a negative flap angle, such as flap lever position 214, the flap controller 150 sends a flap position signal to the actuator 108 to move the carriage 106 to a flap position providing the desired negative flap angle. When the flap position input lever 200 is moved to any flap lever position other than the flap lever position 206, the flap controller 150 sends a flap position signal to the actuator 108 to move the carriage 106 to a flap position providing the desired positive flap angle regardless of the position of the flap position input lever 212.

Figure 11:
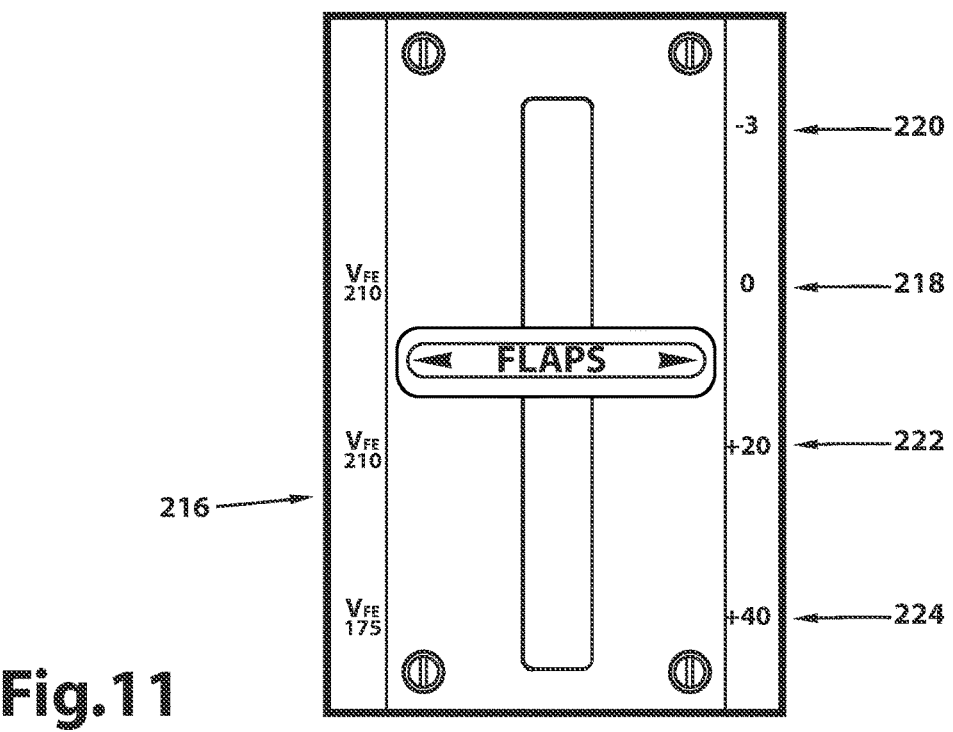

In the embodiment shown in FIG. 11, the flap position input device 152 includes a flap position input lever 216. The flap position input lever 216 has multiple flap lever positions including a flap lever position 218 corresponding to the retracted flap position of FIG. 3, a flap lever position 220 corresponding to the intermediate flap up position of FIG. 4, a flap lever position 222 corresponding to the intermediate flap down position of FIG. 5, and a flap lever position 224 corresponding to the extended flap position of FIG. 6. The flap controller 150 receives a flap input signal indicative of the position of the flap input lever 216. The flap controller 150 determines the desired flap position based on the flap input signal and sends a flap position signal to the actuator 108 to move the carriage 106 to a position providing the desired flap position. As can be seen, the flap lever position 218 is between the flap lever positions 220 and 222. This means that the flap 100 can only be moved to the intermediate flap up position from the retracted position.

Figure 12:
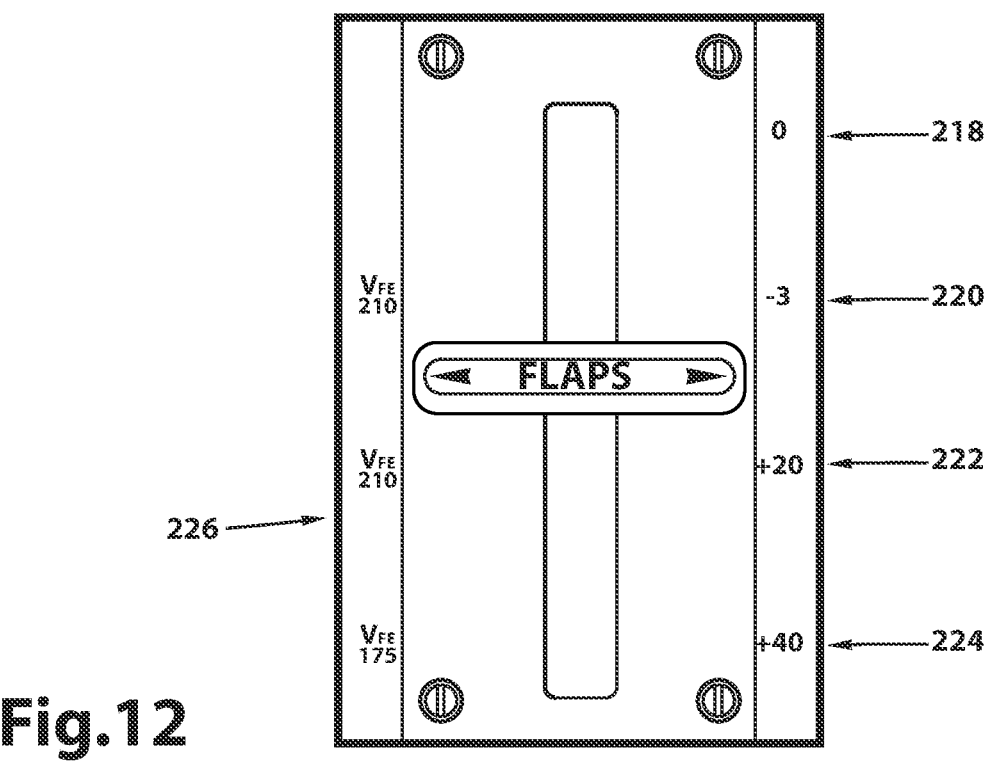

In the embodiment shown in FIG. 12, the flap position input device 152 includes a flap position input lever 226. The flap position input lever 226 has multiple flap lever positions including the flap lever position 218, 220, 222, 224 of the flap position input lever 216 described above, except that in the flap position input lever 226 the flap lever position 220 is between the flap lever position 218 and 222.

Figure 13:
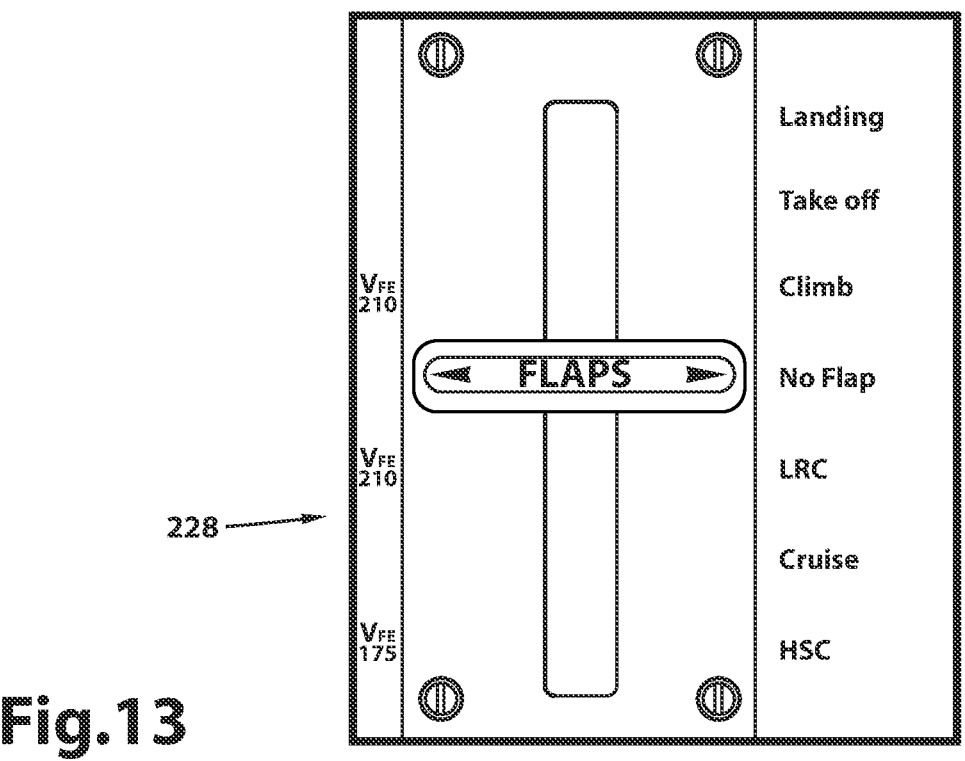

In the embodiment shown in FIG. 13, the flap position input device 152 includes a flap position input lever 228. Instead of indicating desired flap angles like in the embodiments described above, the flap position input lever 228 indicates different flight conditions. The flap controller 150 receives a flap input signal corresponding to the selected flight condition and determines a flap position suitable to the selected flight condition, which includes flap positions having negative flap angles. It is contemplated that the flap controller 150 could also use signal received from one or more aircraft operating condition sensors 154 to determine the suitable flap position. The flap controller 150 then sends a flap position signal to the actuator 18 to move the carriage 106 to a position providing the flap position determined by the flap controller 150. In the embodiment illustrated in FIG. 13, the flight conditions are landing, takeoff, climb, no flap (i.e. flaps in the retracted flap position), low range cruise (LRC), cruise, and high-speed cruise (HSC). It is contemplated that the flap position input lever 228 could have more or less flight condition positions and/or could have different flight condition positions.

Turning now to FIG. 14, some of the aircraft operating condition sensors 154 which could be used by the flap controller 150 to determine a desired flap position will be briefly described. These are an altimeter 250, an attitude sensor 252, and an air speed sensor 254. The altimeter 250 senses an altitude of the aircraft 10 and sends a signal indicative of the altitude to the flap controller 150. The attitude sensor 252 senses an orientation of the aircraft 10 relative to Earth's horizon and sends a signal indicative of this orientation to the flap controller 150. The air speed sensor 254 senses the air speed of the aircraft 10 and sends a signal representative of this speed to the flap controller 150. It is contemplated that some or all of the above sensors 250, 252, 254 could not be used by the flap controller 150 and that other sensors could be used. For example, a fuel level sensor (not shown) sensing the amount of fuel in the fuel reservoirs (not shown) of the aircraft 10 could be used by the flap controller 150 in determining the desired flap position.

Figure 15:
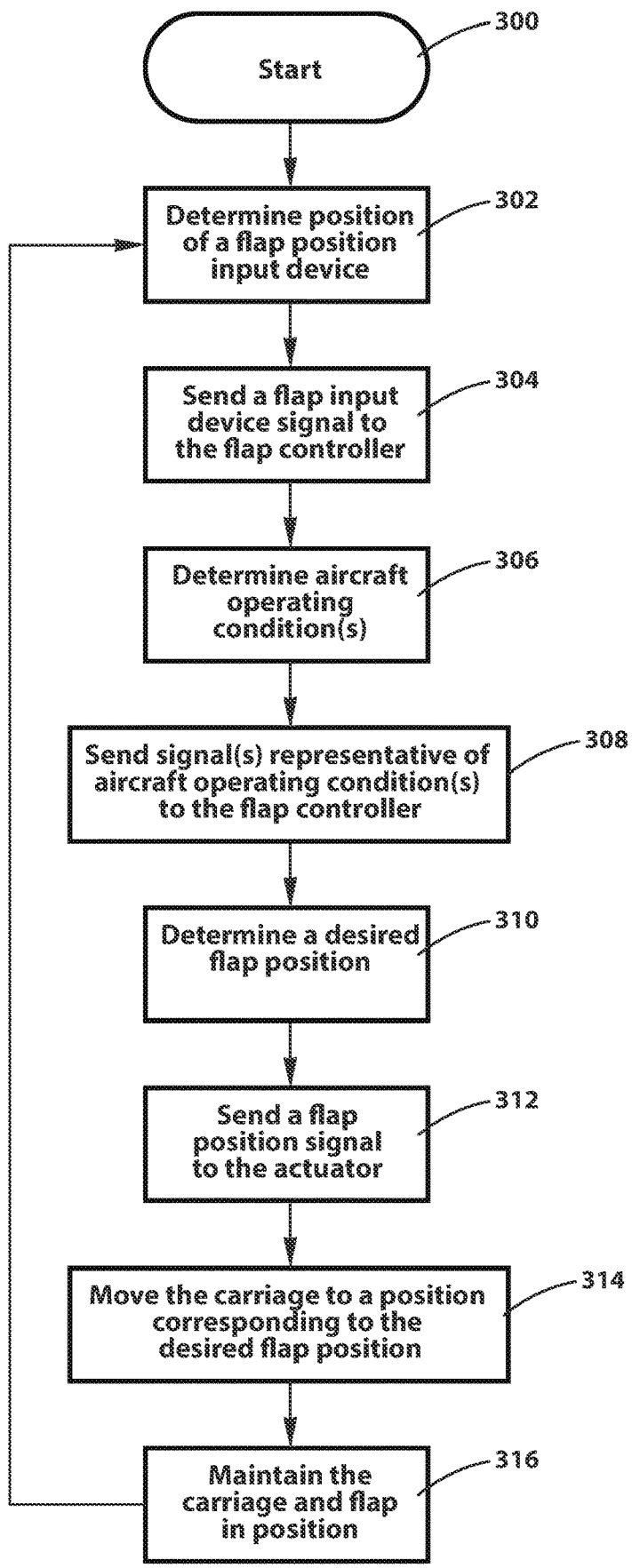
FIG. 15 illustrates a method for controlling the flaps of the aircraft of FIG. 1.

Turning now to FIG. 15, a method for controlling the flap 100 of the aircraft 10 will be described. The method begins at step 300 when the various systems of the aircraft 10 are turned on. At step 302, a position of the flap position input device (or devices) 152 is determined. In embodiments where the flap position input device 152 is a lever, this can be achieved by a lever position sensor (not shown). Then at step 304, a flap input signal representative of the position determined at step 302 is sent to the flap controller. Following step 304, at step 306, one or more aircraft operating conditions are determined by one or more corresponding aircraft operating condition sensors 154. Then at step 308, one or more signals representative of the one or more aircraft operating conditions determined at step 306 are sent to the flap controller 150. It is contemplated that steps 306, 308 could be performed before steps 302, 304. It is also contemplated that step 306, 308 could be performed in parallel with steps 302, 304.

Then at step 310, the flap controller 150 determines a desired flap position based on the signals received at steps 304 and 308. It is contemplated that additional factors could be taken into consideration by the flap controller 150 in determining the desired flap position.

In one embodiment of step 310, when the flap position input device(s) 152 is set at a position corresponding to the retracted flap position, to an intermediate flap down position or to the extended flap position, the flap controller 150 determines the desired flap position to be this flap position regardless of the inputs received at step 308. It is however contemplated that the inputs received at step 308 could be used to make small angular adjustments to the flap position selected by the flap input position device(s) 152, in which case the determined desired flap position would be this adjusted flap position. It is also contemplated that the inputs received at step 308 could be used to prevent movement of the flap 100 to a particular flap position during certain operating conditions. For example, if the altimeter 250 and air speed sensor 254 show rapid descent and deceleration consistent with landing of the aircraft 10, the flap controller 150 could determined that the desired flap position should be an intermediate flap down position or the extended flap position even though the flap position input device 152 has been set to a position corresponding to the intermediate flap up position or the retracted flap position.

In one embodiment of step 310, the flap controller 150 determines that the desired flap position is the intermediate flap up position when the flap position input device 152 is set at a position corresponding to the intermediate flap up position regardless of the signals received at step 308. This could be the case for example when the flap position input device 152 is the flap position input lever 216 or 226 described above. As in the embodiment above, it is contemplated that the signals received at step 308 could be used to make small angular adjustments to the flap position selected by the flap input position device(s) 152, in which case the determined desired flap position would be this adjusted flap position, or could be used to prevent movement of the flap 100 to the intermediate flap up position under certain circumstances.

In another embodiment of step 310, for embodiments of the aircraft flap deployment system having two flap position input devices 152, like those shown and described above with respect to FIGS. 9 and 10, the flap controller 150 determines that the desired flap position is the intermediate flap up position when a first one of the flap position input devices 152 is set at a position corresponding to the retracted flap position and the second one of the flap position input devices 152 is set at a position corresponding to the intermediate flap up position. If the first one of the flap position input devices 152 is set at any position other than a position corresponding to the retracted flap position, then the flap controller 152 will determine the desired flap position based on the position selected by the first one of the flap position input devices 152, and will disregard the intermediate flap up position selected by the second one of the flap position input devices 152. It is contemplated that the signals received at step 308 could be disregarded, could be used to make adjustments to the intermediate flap up position, or could be used to prevent the movement of the flap 100 to the intermediate flap up position under certain circumstances.

In another embodiment, it is contemplated that the flap controller 150 could automatically determine when the desired flap position should be the intermediate flap up position based on the signals received at step 308. In some versions of such an embodiment, the flap controller 150 could make this determination only if the flap position input device 152 is in a position corresponding to the retracted flap position and/or if the pilot has input that automatic flap control is permitted, such as by pressing the button 202 described above. For example, if the signals received by the flap controller 150 at step 308 indicate that the aircraft 10 is operating at an altitude, airspeed, and within a range of attitudes that are indicative of the aircraft 10 operating under cruise conditions, then at step 310 the flap controller 150 determines that the desired flap condition is the intermediate flap up position. It is contemplated that other aircraft operating conditions could be taken into account. For example, as the amount of fuel in the fuel reservoirs decreases, the aircraft 10 becomes lighter and therefore requires less lift. In such an example, flap controller 150 could position the flap 10 in an intermediate flap up position which has an increasingly negative flap angle as the amount of fuel decreases, thereby decreasing lift and the lift-induced drag.

In some embodiments, it is contemplated that step 306, 308 could be omitted and that at step 310 the flap controller 150 would determine the desired flap position based only on the signal received at step 304.

Once the flap controller 150 has determined the desired flap position at step 310, then at step 312 the flap controller 150 sends a flap position signal corresponding to the desired flap position to the actuator 108.

Then at step 314, in response to receiving the flap position signal, the actuator 108 moves the carriage 106 to the position along the track 104 that corresponds to the desired flap position and will therefore set the flap 100 at the desired flap position.

Once the actuator 108 has moved the carriage 106 to the correct position, the actuator 108 stops and maintains the carriage 106, and therefore the flap 100, in position. The method then resumes at step 302. The actuator 108 will maintain the carriage 106 and the flap 100 in position until a different desired flap position is determined by the flap controller 150 at step 310.

Figure 16:
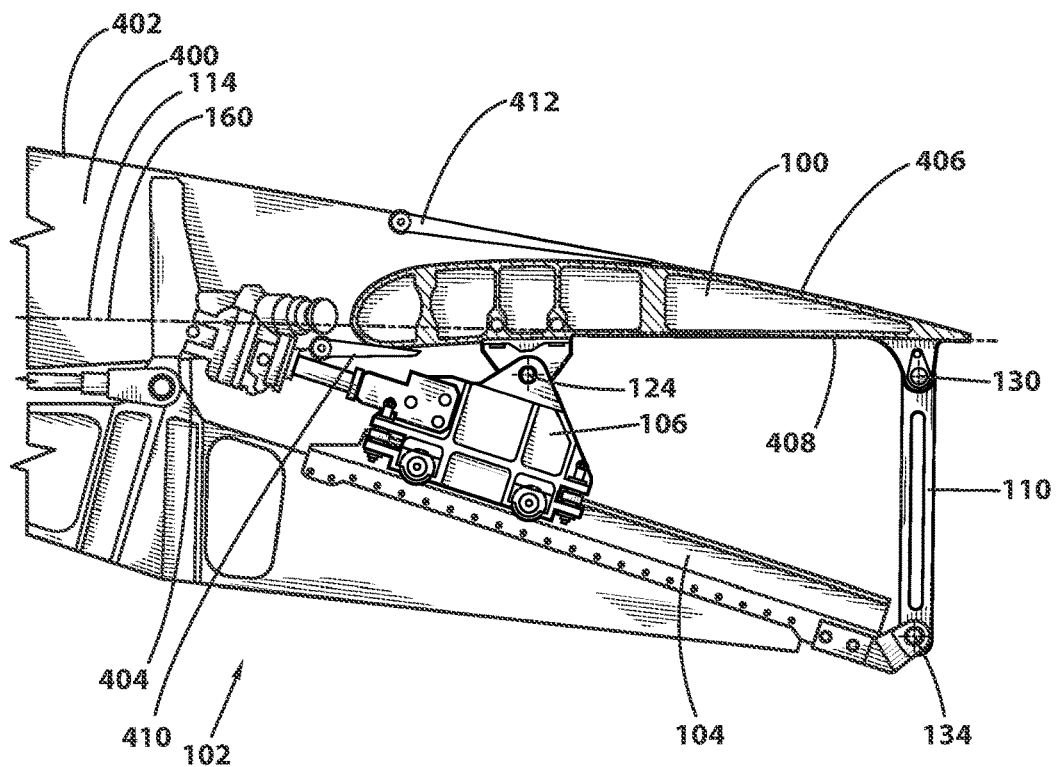
FIG. 16 is a schematic cross-sectional view of an alternative embodiment the aircraft wing assembly of FIG. 2, with the flap in a retracted flap position.
Figure 17:
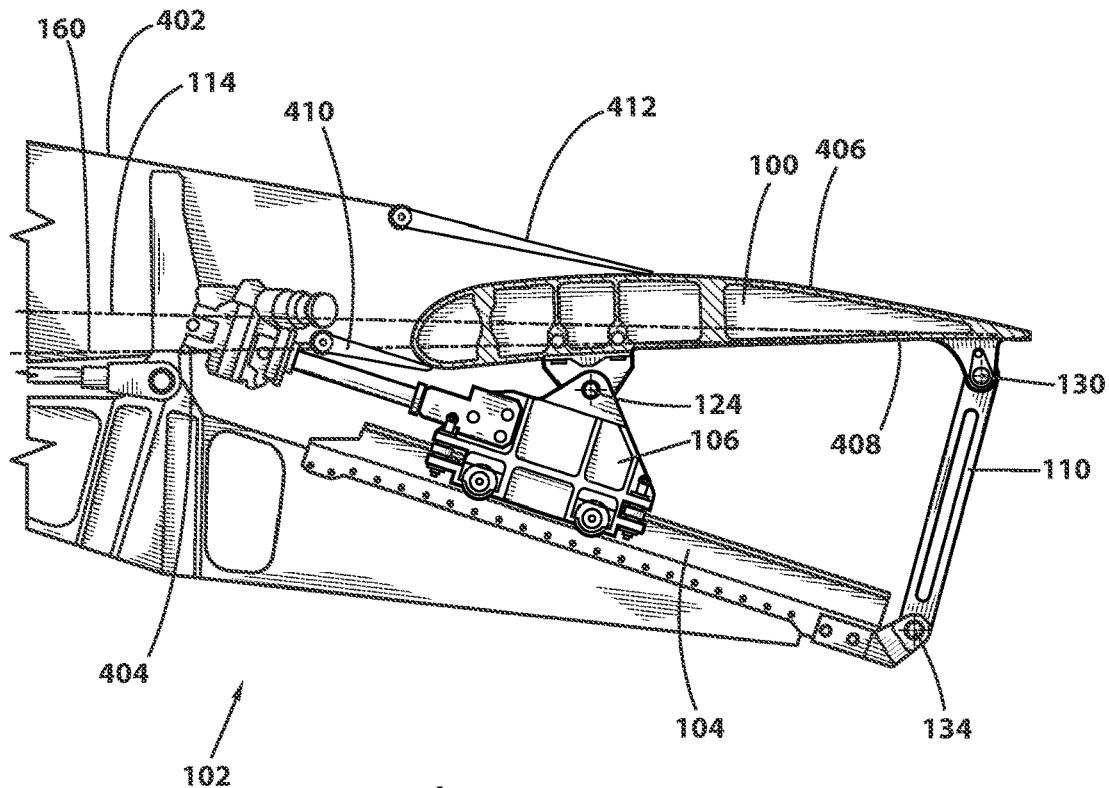
FIG. 17 is a schematic cross-sectional view of the aircraft wing assembly of FIG. 16, with the flap in an intermediate flap up position.

Turning now to FIGS. 16 and 17, an aircraft wing assembly, which is an alternative embodiment the aircraft wing assembly describe above with respect to FIGS. 2 to 14, will be described. The aircraft wing assembly of FIGS. 16 to 17 has the same flap 100 and flap deployment system as the aircraft wing assembly of FIGS. 2 to 14, including the flap actuation system 102. For simplicity, elements of the aircraft wing assembly of FIGS. 16 to 17 that are the same as those of the aircraft wing assembly of FIGS. 2 to 14 have been labeled with the same reference numerals and will not be described again in detail.

The aircraft wing assembly of FIGS. 16 and 17 has a wing body 400 having a wing body upper skin 402 and a wing body lower skin 404. Similarly, the flap 100 has a flap upper skin 406 and a flap lower skin 408. As can be seen in FIG. 16, when the flap 100 is in the retracted flap position, a rear portion of the wing body lower skin 404 overlaps a front portion of the flap lower skin 408. This improves the aerodynamic properties of the wing assembly when the flap 100 is in the retracted flap position.

In order to accommodate the downward movement of the front of the flap 100 when the flap 100 is in the intermediate flap up position, the wing body 400 defines a pivotable door 410 on a lower rear portion thereof. When the flap 100 is in or moving to the intermediate flap up position, the door 410 is opened as shown in FIG. 17. When the flap 100 is in the retracted flap position, as shown in FIG. 16, the door 410 is closed. When the flap 100 is in the extended flap position the door 410 is also closed. When the flap 100 is in an intermediate flap down position the door 410 could be opened or closed, depending the location of the front portion of the flap 100. An actuator (not shown) controlled by the flap controller 150 opens and closes the door 410.

A spoiler 412 is pivotally connected to the rear of the wing body 400 at a top thereof. As can be seen by comparing FIGS. 16 and 17 for the retracted and intermediate flap up positions, the spoiler 412 pivots as the flap 100 changes position such that a trailing edge 414 of the spoiler contacts or at least closely follows the flap upper skin 406 throughout the motion of the flap 100. As a result, the spoiler 412 is disposed over at least the front portion of the flap 100 in every flap position, thus eliminating or reducing the gap that would otherwise be formed between the wing body 400 and the flap 100 as the flap 100 is in a flap position other than the retracted flap position. Such a gap can be seen between the wing body 28 and the flap 100 in FIGS. 4 to 6 of the present application. An actuator (not shown) controlled by the flap controller 150 pivots the spoiler 412 as the actuator 108 moves the carriage 106 along the track 104.

The door 410 and the spoiler 412 both improve the aerodynamic properties of the wing assembly shown in FIGS. 16 and 17. It is contemplated that the door 410 or the spoiler 412 could be omitted.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A method for controlling a position of a flap of an aircraft, the flap being pivotally connected to a carriage, the method comprising:
   receiving, by an actuator, a flap position signal indicative of a desired flap position;
   in response to the flap position signal being indicative of the desired flap position being a retracted flap position:
      moving, using the actuator, the carriage along a track to a first carriage position thereby pivoting the flap to the retracted flap position,
      in the retracted flap position, the flap being at a neutral flap angle; and
      maintaining the carriage and the flap in position using the actuator;
   in response to the flap position signal being indicative of the desired flap position being an intermediate flap position:
      moving, using the actuator, the carriage along the track to a second carriage position thereby pivoting the flap to the intermediate flap position,
      in the intermediate flap position, the flap being at a negative flap angle; and
      maintaining the carriage and the flap in position using the actuator;
   in response to the flap position signal being indicative of the desired flap position being an extended flap position:
      moving, using the actuator, the carriage along the track to a third carriage position thereby pivoting the flap to the extended flap position,
      in the extended flap position, the flap being at a positive flap angle; and
      maintaining the carriage and the flap in position using the actuator,
   the second carriage position being intermediate the first and third carriage positions.

2. The method of claim 1, further comprising:
   receiving, by a flap controller, a flap input signal from at least one flap position input device disposed in a cockpit of the aircraft;
   determining, by the flap controller, the desired flap position based at least in part on the flap input signal; and
   sending, by the flap controller, the flap position signal to the actuator, the flap position signal being based on the desired flap position determined by the flap controller.

3. The method of claim 2, wherein:
   the at least one flap position input device is a flap position input lever;
   the flap controller determines that the desired flap position is the retracted flap position when the flap position input lever is in a first flap lever position;
   the flap controller determines that the desired flap position is the intermediate flap position when the flap position input lever is in a second flap lever position; and
   the flap controller determines that the desired flap position is the extended flap position when the flap position input lever is in a third flap lever position.

4. The method of claim 3, wherein the first flap lever position is disposed between the second and third flap lever positions.

5. The method of claim 1, further comprising:
   sensing, using at least one aircraft operating condition sensor, at least one operating condition of the aircraft;
   receiving from the at least aircraft operating condition sensor, by a flap controller, at least one signal representative of the at least one operating condition of the aircraft;
   determining, by the flap controller, the desired flap position based at least in part on the at least one signal representative of the at least one operating condition of the aircraft; and
   sending, by the flap controller, the flap position signal to the actuator, the flap position signal being based on the desired flap position determined by the flap controller.

6. The method of claim 5, wherein the flap controller determines that the desired flap position is the intermediate flap position when the sensed at least one operating condition of the aircraft is indicative of the aircraft operating under cruise conditions.

7. The method of claim 1, wherein:
   moving the carriage from the first carriage position to the second carriage position comprises pivoting the flap in a first direction; and
   moving the carriage from the second carriage position to the third carriage position comprises pivoting the flap in a second direction opposite the first direction.

8. The method of claim 7, wherein:
   moving the carriage from the first carriage position to the second carriage position further comprises translating the flap in a third direction; and
   moving the carriage from the second carriage position to the third carriage position further comprises translating the flap in the third direction.

9. The method of claim 1, wherein the intermediate flap position is an intermediate flap up position;
   the method further comprising:
      in response to the flap position signal being indicative of the desired flap position being an intermediate flap down position:

moving, using the actuator, the carriage along the track to a fourth carriage position thereby pivoting the flap to the intermediate flap down position, the fourth carriage position being intermediate the second and third intermediate carriage positions, in the intermediate flap down position, the flap being at a positive flap angle; and maintaining the carriage and the flap in position using the actuator.

10. An aircraft flap deployment system comprising:

a carriage adapted for slidable connection to a wing body;

a flap pivotally connected at a first pivot point to the carriage;

a link pivotally connected to the flap at a second pivot point, the second pivot point being spaced from the first pivot point;

an actuator operatively connected to the carriage for selectively moving the flap along a flap deployment path, the flap deployment path comprises a flap up position and a flap down position; and a flap controller communicating with the actuator for controlling actuation of the actuator for selectively positioning the flap in the flap up position and maintaining the flap in the flap up position.

11. The aircraft flap deployment system of claim 10, wherein in the flap up position, an upper surface of the flap and an upper surface of a rear portion of the wing body form a negative camber.

12. The aircraft flap deployment system of claim 10, wherein:

in the flap up position, the flap is at a negative flap angle; and in the flap down position, the flap is at a positive flap angle.

\* \* \* \* \*